Oct. 19, 1965 R. DUVA ETAL Re. 25,883

GOLD PLATING

Original Filed Dec. 12, 1962

INVENTORS
ROBERT DUVA
DONALD GARDNER FOULKE

By Greene, Pineles & Durr

United States Patent Office

Re. 25,883
Reissued Oct. 19, 1965

25,883

GOLD PLATING

Robert Duva, Paramus, and Donald Gardner Foulke, Watchung, N.J., assignors to Sel-Rex Corporation, Nutley, N.J., a corporation of New Jersey Original No. 3,156,634, dated Nov. 10, 1964, Ser. No. 244,204, Dec. 12, 1962. Application for reissue May 12, 1965, Ser. No. 456,607
9 Claims. (Cl. 204—43)

Figure 1:
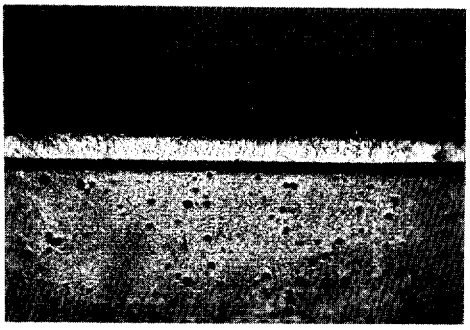

Matter enclosed in heavy brackets [ ] appears in the original patent but forms no part of this reissue specification; matter printed in italics indicates the additions made by reissue.

This invention relates to the deposition of gold and is especially related to the deposition of pure, 24-carat gold.

Pure gold is commonly plated from a potassium cyanide solution operated at about 60°–70° C. and as is common with cyanide baths heavy deposits tend to become rough and lacking in density from a structure standpoint. Furthermore, such solutions tend to decompose to yield cyanide breakdown products which are deleterious. Carbon treatment then is required and even continuous carbon treatment has proved to be inadequate for some of the recent rigid specifications established. Among the objects of the invention, therefore, is to provide an improved process and bath for depositing substantially pure gold electrolytically.

Although the process and composition [is] *are* especially related to the electrodeposition of pure gold, it has also been found advantageous in the deposition of alloy gold, 10 to 24 carat gold, for example, and the bath can contain up to about [18] *60* g./l. of a base metal ion.

This application is a continuation-in-part of U.S. application Serial No. 106,924, filed May 1, 1961, now abandoned.

The acid gold solutions described by Rinker and Duva in Patent No. 3,104,212 provided a means whereby heavy, sound gold deposits could be obtained by depositing the gold from a solution containing potassium gold cyanide and the salts of weak organic acids at a pH of 3–6 from room temperature to about 70° C. Similarly mirror bright alloy gold deposits are obtained by the process and composition disclosed in U.S. 2,905,-601.

The present invention is based on the discovery that deposits from such an acid solution can be greatly improved by the addition of small amounts, of hydrazine and substituted hydrazines and salts of hydrazine and substituted hydrazine. The deposits become semi-bright to almost bright, are extremely smooth and particularly receptive to soldering and gold alloy die attachment operations. Furthermore, the pH range of operation of the bath can be extended to from 2.5 to 7.0.

The exact mechanism of the action of hydrazines in such a system is unknown, however, it is known that as gold is plated out of such solutions and additional gold is added in the form of potassium gold cyanide—the common commercial procedure—build-up of some KCN must occur. This would naturally tend to cause the formation of the type of deposit obtained from cyanide formations, in a reduced amount to be sure. Substituted hydrazines are known to react with cyanide in the presence of copper and other metal cyanides (Sandmeyer reaction) and it is possible that this explains the effect; then again, it may be that isocyanates or isocyanides are formed.

In any event, there is a definite improvement in deposits obtained from organic acid gold baths containing hydrazine and related compounds and the salts of hydrazine and related compounds conforming to the structure,

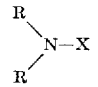

where R is selected from the group of hydrogen, an alkyl of 6 carbon atoms or less and an aryl group containing up to 6 carbon atoms. X may be

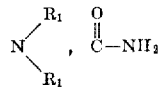

and OH, where $R_1$ is selected from the group consisting of hydrogen, an alkyl group of up to 6 carbon atoms and an aryl group of up to 6 carbon atoms. If hydrazine or its related compounds, as defined, per se, are added to the bath, the salt may be formed within the bath. In the claims, therefore, it will be understood that a bath which contains a salt of hydrazine or its related compounds (as defined) will be understood to contain hydrazine or the related compound.

Figure 2:
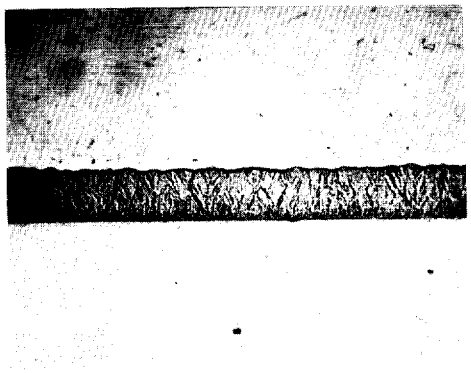

FIGS. 1 and 2 are photomicrographs of a cross section of basis metal with a gold plating thereon.

Where an alloy gold is to be deposited the metal to be alloyed with the gold may be, for example, arsenic, cobalt, chromium, iron, tin, nickel, antimony, manganese, etc., and is added in a form of soluble salt or complex which provides the metal in the cathode film in a form, probably ionic, such that it will codeposit with the gold. With alloy gold a primary advantage of the addition is in reducing stress in the deposit.

The method of carrying out this invention will become clear in the examples to follow.

EXAMPLE 1

To a solution containing 135 g./l. of potassium citrate and 55 g./l. of citric acid was added 16 g./l. of gold as potassium gold cyanide. At a pH of 4.2, a temperature of 70° C. and a current density of 0.2 amp/dm.$^2$ a rather uniform matte deposit was obtained. To the bath was then added 6 g./l. of hydrazine sulfate and after this material was dissolved in the solution, another panel (2.54 x 10″ cm.) was plated. The deposit was semi-bright and particularly uniform. The photomicrograph attached indicates an exceedingly sound deposit. See FIG. 1.

EXAMPLE 2

To a bath as described in Example 1, absent the hydrazine sulfate, was added 5 g./l. of methyl hydrazine. Excellent deposits were obtained, see FIGURE 2, at 0.2 amp/dm.$^2$.

EXAMPLE 3

1,1-dimethyl hydrazine, 5 g./l., was substituted for the methyl hydrazine of Example 2. Again, excellent, sound, semi-bright deposits were obtained at 0.2 amp/dm.$^2$.

EXAMPLE 4

A bath was made up containing 50 g./l. of citric acid, 135 g./l. of potassium citrate and 8 g./l. of gold as potassium gold cyanide. The pH was 4.2. To this standard bath was added 5 g./l. of hydroxyl amine hydrochloride. At 60° C. and 0.2 amp/dm.$^2$ a yellow, sound deposit was obtained, 3.068 g. depositing in 4 hours at 0.2 amp/dm.$^2$.

EXAMPLE 5

To the standard bath used in Example 3 was added 5 g./l. of phenylhydrazine. The deposit obtained was yellow in color and sound, appearing better than similar deposits from the acid gold bath absent the phenylhydrazine. Some precipitation was noted in the bath. In 3½ hours, 2.342 g. of gold were deposited at 0.2 amp/dm.$^2$.

EXAMPLE 6

To the standard bath as disclosed in Example 3 was added 10 g./l. of urea. The deposit obtained was sound and the efficiency was 120 mg./ampere minute.

In other experiments the same characteristic fine-grained deposits were obtained over wide current density ranges, 0.1–1.5 amperes/dm.$^2$ with 4 to 16 g./l. of gold, and 10–200 g./l. of an organic acid ion, usually citric acid. The pH was not as critical as when the bath was operated without the hydrazine type additions and the bath could be operated at pH values from 2.5 to 7.0.

EXAMPLE 7

A bath was made up containing 50 g./l. of potassium citrate, 10 g./l. of citric acid and 8 g. of gold as potassium gold cyanide. The pH adjusted to 4.2. To the bath was added 6 g./l. of hydrazine sulfate and 60 g./l. of nickel as nickel citrate. Excellent stress-free deposits were obtained to a thickness of 20 microns at 1.0 a./dm.$^2$. Without the hydrazine sulfate stress was much greater.

EXAMPLE 8

The process was conducted as in Example 7 but 0.06 g./l. of arsenic added as arsenic citrate was substituted for the nickel. The bath was operated at a current density of 1.0 a./dm.$^2$ and excellent stress-free deposits were obtained.

EXAMPLE 9

The process was conducted as in Example 7 except that 0.5 g./l. of cobalt added as cobalt sulfate was substituted for the nickel of Example 7. The bath was operated at a current density of 5–10 amperes per square decimeter. Excellent low stress deposits were obtained with the stress being lower at 10 a./dm.$^2$.

The features and principles underlying the invention described above in connection with specific exemplifications will suggest to those skilled in the art many other modifications thereof. It is accordingly desired that the appended claims shall not be limited to any specific feature or details thereof.

We claim:

1. An aqueous acid gold plating bath containing about 10–200 g./l. of a salt of a weak, stable organic acid, 4 to 16 g./l. of gold added as an alkali gold cyanide and, about ½ to about 20 g./l. of a compound having the formula

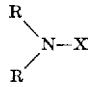

wherein R is selected from the group consisting of hydrogen, an alkyl group of up to 6 carbon atoms, and an aryl group of up to 6 carbon atoms, and where X is selected from the group consisting of

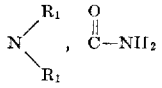

and OH, where $R_1$ is selected from the group consisting of hydrogen, an alkyl group of up to 6 carbon atoms and an aryl group of up to 6 carbon atoms, said bath being adjusted to a pH of 2.5 to 7.0.

2. An aqueous, acid gold plating solution according to claim 1 wherein the organic acid ion is the anion of citric acid.

3. A process for electrodepositing gold which comprises electrolyzing a solution consisting of about 10 to 200 g./l. of the salt of a weak, stable organic acid, about 4 to 16 g./l. of gold added as an alkali gold cyanide and, about ½ to 20 g./l. of a compound having the formula

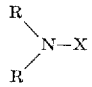

wherein R is selected from the group consisting of hydrogen, an alkyl group of up to 6 carbon atoms, and an aryl group of up to 6 carbon atoms, and where X is selected from the group consisting of

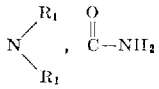

and OH, where $R_1$ is selected from the group consisting of hydrogen, an alkyl group of up to 6 carbon atoms and an aryl group of up to 6 carbon atoms, said bath being adjusted to a pH of 2.5 to 7.0.

4. An aqueous acid gold plating bath containing about 10–200 g./l. of a salt of a weak, stable organic acid, 4 to 16 g./l. of gold added as an alkali gold cyanide and, about ½ to about 20 g./l. of a hydrazine compound, said bath being adjusted to a pH of 2.5 to 7.0.

5. An aqueous acid gold plating bath containing about 10–200 g./l. of a salt of a weak, stable organic acid, 4 to 16 g./l. of gold added as an alkali gold cyanide and, about ½ to about 20 g./l. of hydrazine, said bath being adjusted to a pH of 2.5 to 7.0.

6. An aqueous acid gold plating bath containing about 10–200 g./l. of a salt of a weak, stable organic acid, 4 to 16 g./l. of gold added as an alkali gold cyanide and, about ½ to about 20 g./l. of a hydrazine salt, said bath being adjusted to a pH of 2.5 to 7.0.

7. An aqueous acid gold plating bath containing about 10–200 g./l. of a salt of a weak, stable organic acid, 4 to 16 g./l. of gold added as an alkali gold cyanide and, about ½ to about 20 g./l. of alkyl hydrazine containing up to six carbons in the alkyl group, said bath being adjusted to a pH of 2.5 to 7.0.

8. An aqueous acid gold plating bath containing about 10–200 g./l. of a salt of a weak, stable organic acid, 4 to 16 g./l. of gold added as an alkali gold cyanide and, about ½ to about 20 g./l. of phenyl hydrazine, said bath being adjusted to a pH of 2.5 to 7.0.

9. An aqueous bath as claimed in claim 1 wherein said bath contains in addition up to [18] *60* g./l. of a base metal ion (calculated as metal).

References Cited by the Examiner

The following references, cited by the Examiner, are of record in the patented file of this patent or the original patent.

UNITED STATES PATENTS

| | | | |
|---|---|---|---|
| 2,176,668 | 10/39 | Egeberg et al. | 204—16 |
| 2,967,135 | 1/61 | Ostrow et al. | 204—43 |

JOHN H. MACK, *Primary Examiner.*